Aug. 16, 1938.  E. A. WINFIELD  2,126,939
INTERNAL COMBUSTION ENGINE HEAD
Filed June 13, 1936
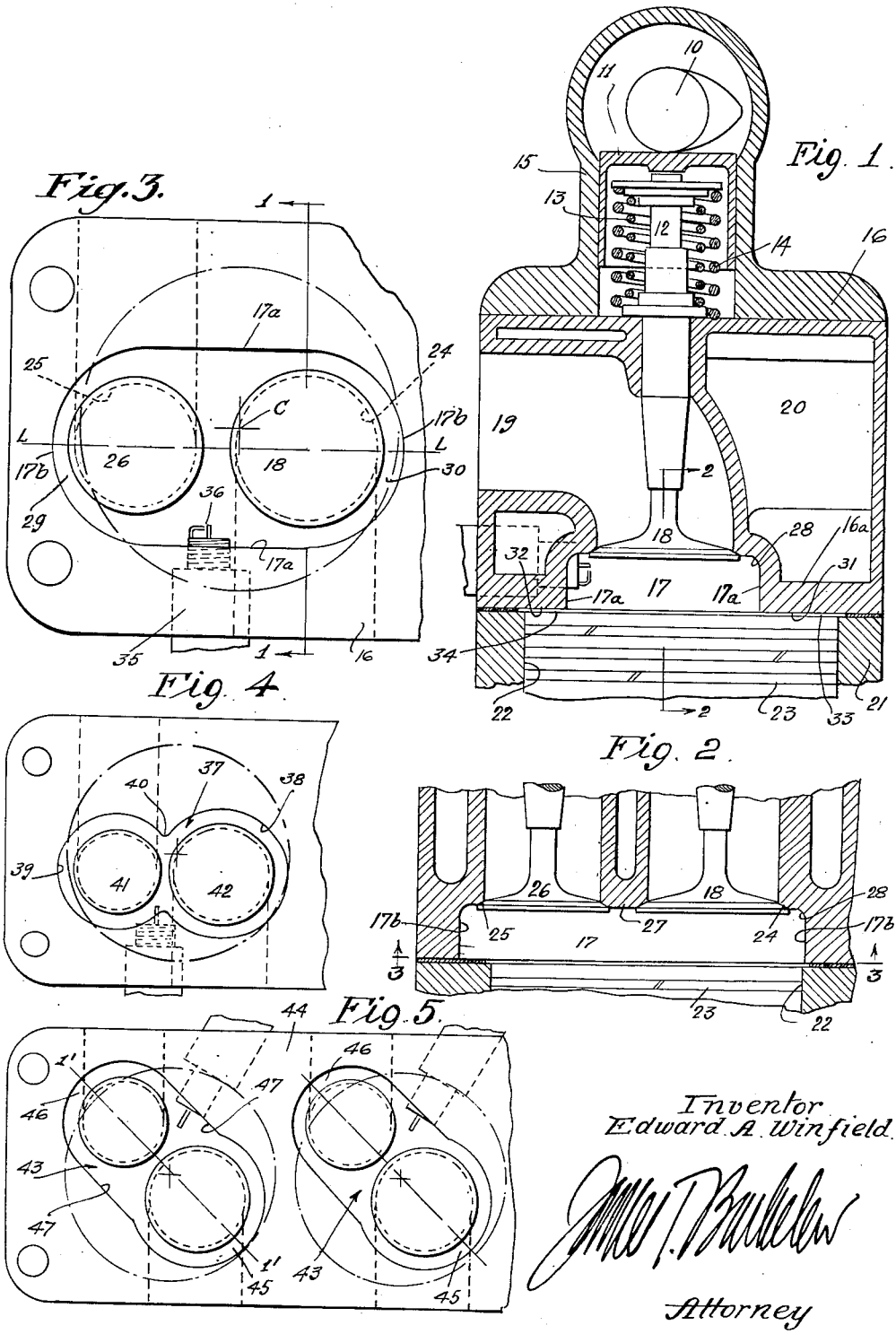
Inventor
Edward A. Winfield
Attorney Patented Aug. 16, 1938

2,126,939

UNITED STATES PATENT OFFICE 2,126,939

INTERNAL COMBUSTION ENGINE HEAD

Edward A. Winfield, La Canada, Calif.

Application June 13, 1936, Serial No. 85,094

2 Claims. (Cl. 123—191)

This invention has to do generally with four-cycle internal combustion engines, and relates particularly to improvement in cylinder heads for that type of engine having overhead valves.

My principal object is to provide an improved form of head that will enable the compression ratio of the entire engine to be increased to a maximum within practical limits, without restricting the flow of gases around the valve, and at the same time prevent the tendency toward detonation that usually results from an increase of the compression ratio. A further object of the invention is to provide a type of head possessing these important features, that may be easily and economically manufactured by reason of its adaptability to being formed by simple machining operations. Generally speaking, I accomplish this object by forming the individual cylinder combustion chamber in the head of such small dimensions as to give the desired high compression ratio, allowing the piston to travel close to the lower face of the cylinder head on its compression stroke, and providing a heat conductive wall directly overlying the piston and having the effect of preventing detonation by conducting heat from that portion of the compressed fuel charge that would otherwise explode prematurely, at a rate sufficient to cause the entire charge to burn evenly and progressively away from the point of ignition. Detonating tendencies also are avoided by reason of the head formation confining the flame to a relatively short length of travel. The combustion chamber comprises an elongated cavity in the engine head directly above the cylinder, both ends of the chamber being closed allowing sufficient clearance around the valves in the top wall of the chamber, to permit unrestricted gas flow past the valves. The width of the combustion chamber is less than the cylinder diameter so that the under-surface of the head beyond at least one side, and preferably beyond both sides of the chamber, directly overlies the piston. At the end of its compression stroke the piston forms with these overlying surfaces of the head, narrow compression spaces from which heat is rapidly conducted as the charge is being compressed, by reason of the large surface area of the metallic heat conductive walls. By thus keeping down the temperature of the compressed fuel charge, I am able to produce an even flame propagation as the charge burns and avoid untimely explosion of portions of the charge that would otherwise cause detonation.

All the various aspects and objects of the invention, as well as the specific characteristics of certain typical and illustrative forms thereof, will be fully understood from the following detailed description. Throughout the description reference is had to the accompanying drawing, in which:

Fig. 1, illustrating one typical form of the invention, is a transverse section taken through the upper end of the cylinder and head at the intake valve port, as indicated by line 1—1 in Fig. 3;

Fig. 2 is a fragmentary section taken on line 2—2 of Fig. 1, longitudinally through the combustion chamber;

Fig. 3 is a view looking upward into the combustion chamber from line 3—3 of Fig. 2;

Fig. 4 is a reduced scale view similar to Fig. 3, showing a variational form of the invention; and Fig. 5 is a similar view illustrating a second variational form of the invention.

In the sectional view of Fig. 1, I have shown one of the usual or conventional forms of cam mechanism for operating the valves and comprising a cam shaft 10, follower 11, intake valve tappet 12 and the valve springs 13 and 14, all contained within housing 15 mounted on the engine head 16. The combustible fuel mixture is admitted to the combustion chamber 17 under control of the intake valve 18 through the intake passage 19 cooled by the water jacket 20. The head 16 is mounted on the engine block 21 in the usual manner with the combustion chamber 17 directly above the cylinder 22 containing piston 23.

Combustion chamber 17 is elongated in shape, as best illustrated in Fig. 3, the width of the chamber being substantially less than the cylinder diameter. Circular intake and exhaust ports 24 and 25, containing the intake and exhaust valves 18 and 26, respectively, are formed in the top wall 27 of the combustion chamber. The relative sizes of the intake and exhaust ports, and their positions with relation to the cylinder 22 may vary with different designs, although, as viewed in Fig. 3, the intake port 24 and the adjacent end wall of the combustion chamber preferably will substantially overlie the cylinder so that the fuel mixture may enter the cylinder in a direct downward path. When required to obtain proper valve spacing, the exhaust port 25, and, if necessary, the intake port 24, may extend beyond the projected cylinder circle, although in other designs both ports may lie entirely within the projected cylinder area. Fig. 3 shows the exhaust port 25 to project beyond and the intake port 24 to lie within the projected cylinder circle.

Preferably the side and end walls 17a and 17b of the combustion chamber extend substantially vertically with a suitable curvature at the top as indicated at 28. The ends 17b of the chamber are horizontally and circularly curved in shape with the center of curvature on the valve center line L, the radius of curvature being selected to give just the necessary amount of clearance at 29 and 30 between the valves and the end walls 17b, to permit unrestricted flow of gas past the valves around their entire peripheries. In Fig. 3 the end walls 17b have the same curvature with their centers of curvature at the valve centers.

Due to the shape characteristics of the combustion chamber the under surfaces 31 and 32 of the head 16 directly overlie the piston 23, and at the end of the piston compression stroke, as illustrated in Fig. 1, form with the piston, narrow compression spaces 33 and 34. Preferably the longitudinal center line L of the combustion chamber 17 is offset from the axial center C of the cylinder, so that surface 31 overlies the piston a greater distance than surface 32. The fuel charge in the combustion chamber is ignited by a spark plug 35 which may be located either within the top or side wall of chamber 17, and is typically shown to enter the chamber at the top of one of the side walls 17a. The plug preferably is offset longitudinally of the combustion chamber toward the exhaust valve so that the fuel is ignited from the plug points 36 at a point that is nearer the exhaust valve than the intake valve, or in other words at a relatively hot zone in the combustion chamber. It will be understood that the volume of chamber 17 is predetermined with reference to the piston displacement volume, to give any desired compression ratio.

In operation, after the fuel charge has been admitted to the cylinder and the piston approaches the end of its compression stroke, the charge is fired in the compression chamber 17 at a point 36 which, as previously stated, preferably is located toward the exhaust valve and within the hottest portion of the chamber. After ignition, the fuel charge burns in a flame that propagates radially from the point of ignition, that is to say, that portion of the charge in the immediate vicinity of the point of ignition burns first, and the flame then spreads radially and downwardly within the combustion chamber to progressively burn the remainder of the charge within the more remote portions of the total combustion space, including the upper interior of the cylinder. As I have mentioned, in order to avoid detonation, particularly when the fuel is being burned under high compression, it is necessary that the fuel charge burn evenly in the sense that the flame propagation will occur progressively from the point of ignition. Detonation commonly is caused by the more remote portion of the fuel charge becoming overheated by the combined compression effects of the piston and the initial burning of the fuel charge, causing it to explode in advance of the time when it would otherwise become ignited by uniform and orderly progression of the flame front starting at the contact points of the plug. In accordance with the invention, I avoid any tendency of this character toward detonation by keeping down the temperature of the more remote portion of the fuel charge during compression, to a point where it will not ignite spontaneously or until reached by the main combustion flame.

When the charge is ignited as the piston approaches the end of its compression stroke, that portion of the charge within the compression chamber nearest the wall 17a through which the plug projects, and within space 34 (Fig. 1) below surface 32, is burned first. The flame then spreads toward the ends and opposite side of the combustion chamber, and also downwardly into the cylinder toward space 33 between the piston and surface 31 of the head. As the piston reaches the end of its stroke, heat is rapidly dissipated from the remote portion of the charge contained in space 33, largely by conduction through the overlying wall 16a of the head, the area of the heat conducting metal surface being large as compared with the volume of the charge in space 33, since the latter is reduced to very narrow proportions at the end of the piston stroke. The result is that the continuous and rapid dissipation of heat from the fuel charge prevents a temperature rise sufficient to induce premature burning and detonation.

The variational form of the invention shown in Fig. 4 is generally similar to the previously described embodiment except with reference to the shape of the combustion chamber. In the variant form, the combustion chamber 37 is formed by drilling intersecting bores 38 and 39, in the head, with the sides of the chamber projecting inwardly at 40 between the valves 41 and 42, instead of the sides extending parallel with the center line of the chamber, as in Fig. 3. Bores 38 and 39 are concentric with the intake and exhaust valve ports, respectively, and have the proper clearance about the valves to permit unobstructed gas flow into and out of the compression chamber.

In the second variant form of the invention shown in Fig. 5, the combustion chambers 43 are arranged diagonally of the head 44, with the ends 45 of the chambers at the intake valve lying within the projected circle of the cylinder, and the opposite ends 46 of the chambers projecting beyond said circle. Side walls 47 of the chamber are spaced a distance corresponding to the diameter of the smaller circular end wall 46 and extend parallel with the combustion chamber center line l' to points of intersection with the end wall 45 of larger curvature.

It will be observed that the shape of the combustion chamber in each of the illustrated embodiments of the invention, is such as to adapt it to being formed by a simple machining operation. For example, the combustion chamber in Fig. 3 may be formed simply by drilling a bore centered at substantially a valve center, by a tool that then may be advanced along line L to mill out the chamber to the desired length. The form of chamber illustrated in Fig. 4 may be formed simply by drilling or reaming intersecting bores about the valve port locations, while to form the combustion chamber in Fig. 5, a larger bore may be drilled to form the intake valve end of the chamber and the remainder and relatively narrow portion of the chamber formed by a milling tool cutting a circular ended cavity intersecting the larger bore.

The variational forms of the invention shown in Figs. 4 and 5 have been found to possess certain highly important advantages over the form illustrated in Figs. 1 to 3. It has been found that the performance of at least certain types of engines is materially improved by making the exhaust gas valve port of smaller diameter than the intake valve port. For example, the order of differential in the valve port diameters may be substantially as illustrated in the drawing. In accordance with the forms of the invention shown in Figs. 4 and 5, advantage is taken of the differential in the valve port sizes to shape the combustion chamber in ways that will produce highly effective results in providing for desirably high compression ratios without increasing the tendency toward detonation. By reducing the curvature of the combustion chamber end wall beyond the exhaust valve, as compared with the wall curvature of the opposite end of the chamber beyond the intake valve, I am able to materially reduce the volume of the chamber, and thereby establish higher compression ratio. At the same time, however, I provide ample clearance about the valves to permit instantaneous flow of combustible mixture and gases into and out of the chamber. I have previously spoken of the tendency for detonation to be diminished by the maintenance of narrow compression spaces at 33 and 34 between the under-surface of the head and the piston as the latter approaches the upper limit of its stroke. A further detonation reducing condition exists in the forms of the invention shown in Figs. 4 and 5, by reason of the fact that because of the reduced volume of the exhaust valve end of the chamber, a proportionately reduced amount of the fuel charge is exposed to the hottest portion of the chamber, i. e. the immediate vicinity of the exhaust. This definitely has been established as effective in reducing or inhibiting detonation.

These effects, i. e. higher compression ratio and detonation prevention, are carried to the furthest degrees in Fig. 4, wherein maximum reduction in total volume of the combustion chamber, and particularly the volume of the exhaust valve end thereof, result from the inwardly projecting portions of the chamber side walls formed at 48 by the intersection of bores 38 and 39.

A further advantage, also particularly characteristic of the form shown in Fig. 4, is the ability to form the combustion chamber walls at the same time, or at least in the same operations in which the valve ports are being drilled. Since the respective ports and the chamber walls at the outside thereof are concentric, after the port is drilled the head may be counterbored to form the chamber wall in the same sequence of operation. These possibilities greatly facilitate machining the head as compared with the operations required in forming the usual types of heads.

In general, the advantages to be gained by making the exhaust valve smaller than the intake are those related to obtaining high volumetric efficiency in engine operation. In modern high speed engines it is becoming an increasingly difficult problem to provide valves large enough to produce high volumetric efficiency at high engine speeds, because of space limitations in the combustion chamber with valves overhead. This being the case, the question arises as to whether power requirements are best met by making the intake and exhaust valves both the same size or whether something can be gained by increasing the intake size and reducing the exhaust or vice versa.

Because of the above considerations, I have conducted extensive tests and have determined that definite advantages result from providing a size differential between the exhaust and inlet valves and their ports. The results of these tests indicate definitely that the exhaust valve and port should be smaller than the intake valve and its port, for example, substantially as shown in the drawing. Apparently, the charging and scavenging of the cylinder is best performed when the available combustion chamber space is modified in conformity with the differential valve sizes as shown.

A further important advantage in using as small an exhaust valve as possible is that the hot uncooled surface of the combustion chamber that is formed by the exhaust valve head is reduced in area, and this in turn reduces the heating of the compressed charge enough so that a higher compression ratio may be used without producing detonation. Also the volume of the hottest part of the combustion chamber (that is the part surrounding the exhaust valve) is reduced, with the result that detonation is still further suppressed.

I claim:

1. In an internal combustion engine, a cylinder containing a piston, a head above said cylinder, said head containing an elongated combustion chamber directly above the cylinder and having circular intake and exhaust ports in its top wall, intake and exhaust valves controlling gas flow through said ports, the exhaust valve and its port having smaller diameters than the corresponding diameters of the intake valve and its port, said chamber being closed beyond the valve ports by end walls having horizontal circular curvatures about substantially the centers of the valve ports, the end wall beyond the intake port having a greater radius of curvature than the end wall beyond the exhaust port and the undersurface of said head beyond one side of said chamber overlying the piston and forming with the piston at the end of its compression stroke, a narrow compression space.

2. In an internal combustion engine, a cylinder containing a piston, a head above said cylinder, said head containing an elongated combustion chamber directly above the cylinder and having circular intake and exhaust ports in its top wall, intake and exhaust valves controlling gas flow through said ports, the exhaust valve and its port having smaller diameters than the corresponding diameters of the intake valve and its port, said chamber being closed beyond the valve ports by end walls having horizontal circular curvatures about substantially the centers of the valve ports, the end wall beyond the intake port having a greater radius of curvature than the end wall beyond the exhaust port, and the side walls of the chamber projecting inwardly toward the longitudinal center of the chamber and being formed by the intersection of the circularly curved end walls of the chamber.

EDWARD A. WINFIELD.